April 19, 1927.
O'DELL HINES
SPRING WHEEL
Filed March 13 1926
1,625,025
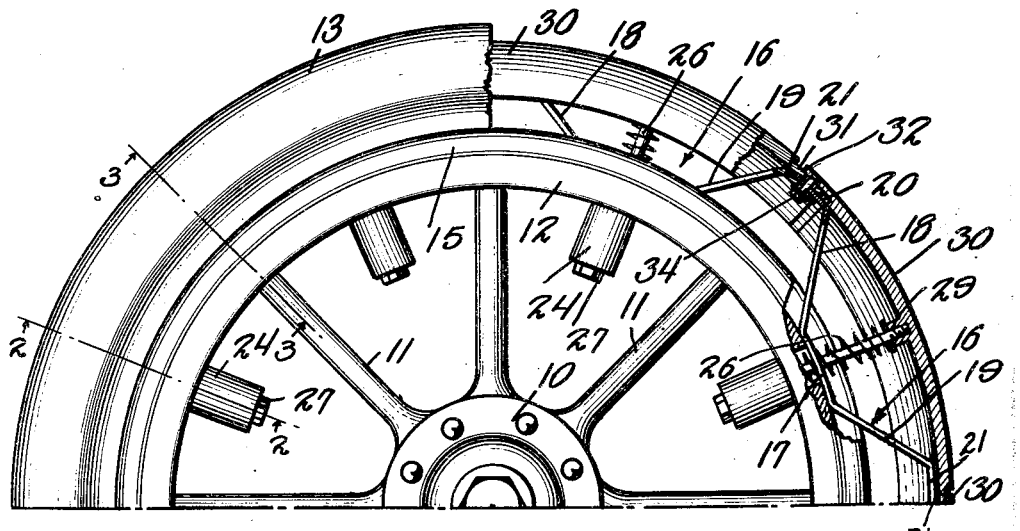
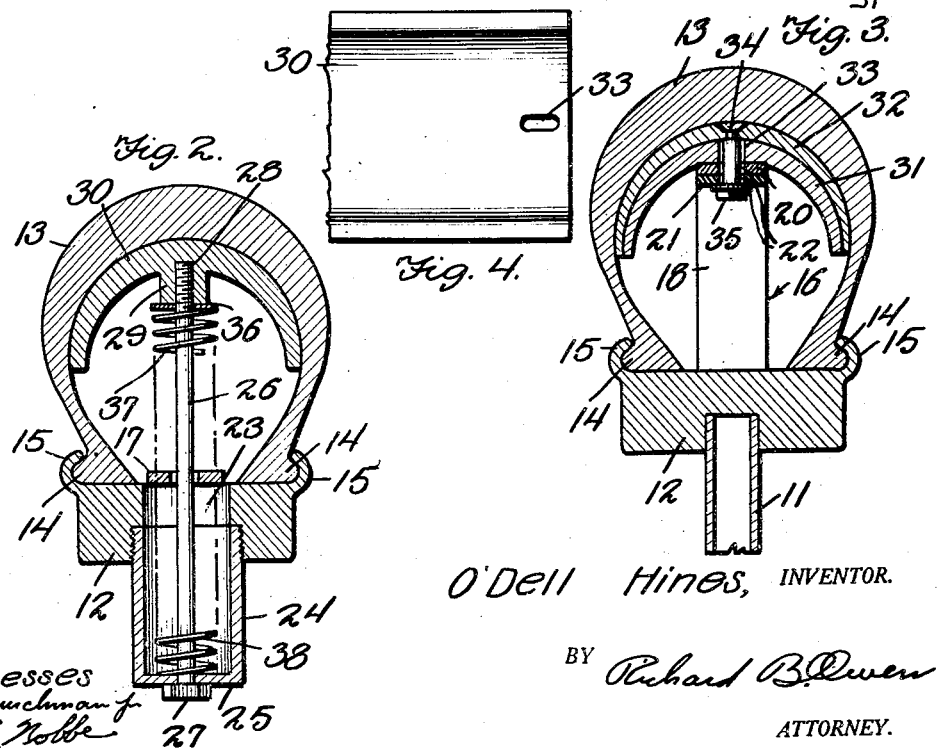
O'Dell Hines, INVENTOR.
BY Richard B. Owen
ATTORNEY.

Patented Apr. 19, 1927.

1,625,025

UNITED STATES PATENT OFFICE.

O'DELL HINES, OF BURNSVILLE, MISSISSIPPI.

SPRING WHEEL.

Application filed March 13, 1926. Serial No. 94,615.

The present invention appertains generally to new and useful improvements in wheels and has more particular reference to a novel and simplified spring wheel adapted primarily for employment under automobiles and similar vehicles.

It is well known that the ordinary automobile tire is kept inflated by an inner tube blown up under air pressure; that these tubes are subject to puncture and that when they are so punctured, the tire collapses.

The principal object of the present invention is, therefore, to provide an improved spring wheel of the class described wherein the necessity of employing an inner tube in the tire or casing is obviated.

Another important object of the present invention is, the provision of an improved spring wheel of the class described, so constructed as to support an ordinary tire or casing but which will be provided with means for replacing the inner tube.

Another object of the present invention is to provide improved and simplified spring means for holding the casing or tire in an inflated position.

A further object of the present invention is the provision of a spring wheel of the class described in connection with which is adapted to be used old automobile tires.

A still further object of the present invention is the provision of such a spring wheel which while simple in construction, is nevertheless strong, sturdy and durable, practical and reliable in its operation and well designed for the purposes for which it is intended.

With the above and other objects in view as will be hereinafter more readily apparent, the invention consists in general of certain novel details of construction and combinations of parts hereinafter more fully described, illustrated in the accompanying drawings and specifically pointed out in the appended claims.

In the accompanying drawings, wherein like characters of reference indicate like parts throughout the several views:

Figure 1 is a side view of a portion of a spring wheel, constructed in accordance with the present invention and being shown partially in section.

Figure 2 is a sectional view on line 2—2 of Figure 1.

Figure 3 is a sectional view on line 3—3 of Figure 1.

Figure 4 is a bottom plan view of a portion of one of the tire supporting shoes.

The improved spring wheel is adapted, as stated above, to receive the ordinary tire casing employed in connection with inflatable tubes and commonly known as pneumatic tire casings, said wheel, however, being so constructed as to obviate the necessity of employing an inner tube with the result that old tires may be used as well as new tires and with equal satisfaction.

Referring more particularly to the accompanying drawings wherein for the purpose of illustration has been disclosed a preferred embodiment of the present invention, the wheel comprises the hub portion 10, from which radiate the usual spokes 11, carrying at their outer ends the felly or rim 12, adapted to receive thereon the tire casing 13 having clincher flanges 14 engaging the inturned flanges 15 of the rim 12 of said wheel, these parts being of the usual construction and being disclosed in the drawings merely by way of illustrating the use of the present invention.

Carried by and encircling the rim 12 between the flanges 15 thereof are a plurality of substantially V-shaped supporting members 16 each comprising a base portion 17, bolted or otherwise secured to the rim and extending outwardly from the opposite ends of the base portion and in divergent relation to each other are the side portions 18 and 19 having the laterally directed terminals or end portions 20 and 21 respectively, the adjacent end portions of the supporting members 16, adapted to overlap one another and being provided with longitudinally extending registering slots 22.

The rim 12 is provided between the spokes 11 with a plurality of radial openings or bores 23 within the inner end of each of which is threaded an elongated cup 24 and passing inwardly through the outer closed end 25, thereof is a substantially long bolt 26, the inner end of which is provided with a head 27 normally abutting the outer face of the closed end 25 of the cup 24, said bolt passing through the base portion 17 of the supporting member 16 and outwardly beyond the said rim 12.

The outer terminal portion of the bolt 26 is screw-threaded as at 28 and is adapted to be received within the internally threaded lug 29 formed on the inner surface of the tire supporting shoe 30 intermediate the ends thereof, the opposite ends 31 and 32 of each of the tire supporting shoes 30 being cut away on their opposite faces with the adjacent end portions of the said shoes 30 adapted to overlap one another. The inner end portion 31 of each shoe is provided with a longitudinally extending slot 33 adapted to register with the slots 22 in the end portions 20 and 21 of the supporting members 16. Secured within the overlapping end 32 of each of the shoes 30 is a counter sunken bolt 34, said bolt extending inwardly through the slot 33 in the adjacent end 31 of the adjoining shoe and also through the slots 22 in the overlapping ends 20 and 21 of the supporting members 16. A suitable lock nut or the like 35 is secured on the inner end of each of said bolts.

From the above construction, it will be readily seen that in the operation of the invention, the tire supporting shoes 30 are permitted to slide circumferentially of the rim 12 relative to one another and that the overlapping ends 20 and 21 of the supporting members 16 are also permitted to slide in opposite directions with respect to each other.

For the purpose of yieldably retaining the casing 13 in an inflated position, there is provided a coil spring 37 encircling each of the bolts 26 within the casing and bearing at its opposite ends against the collar 36 and the base portions 17 of the supporting member 16 while a second coil spring 38 encircles the bolt 26 within the cup 24 and bears at its opposite ends against the inner surface of the base portion 17 of the supporting member 16 and the closed end 25 of the cup 24.

In the operation of the present invention, it will be seen from the above that when the wheel passes over any irregularity in the road, the tire supporting shoes 30 and bolts 26 will be forced inwardly and the shock of this action will be taken up by the expansion coil springs 37 and 38. When the shoes 30 are forced inwardly, they are permitted to slide circumferentially of the rim with respect to one another and this inward action will also cause the side portions 18 and 19 of the supporting members 16 to be urged further apart, this being achieved through the provision of the slots 22 in the ends 20 and 21 thereof.

From the above it will be readily appreciated that it is not essential that the tire or casing 13 be an extra good one and in fact, it may be a very old one inasmuch as in the present invention, it is not necessary to employ an inner tube which would be very susceptible to puncture but instead, means is provided for retaining the tire in an inflated position. It will be noted that the outer faces of the shoes 30 are arcuately curved to snugly receive the tire or casing thereover.

It will be understood that while a preferred embodiment of the present invention has been shown and described, changes in the details of construction thereof may be resorted to without departing from or sacrificing the spirit of the invention.

What is claimed is:

1. A wheel of the character described including a hub, spokes, and rim, a plurality of substantially V-shaped supporting members encircling the rim and secured thereto, the adjacent end portions of said members overlapping one another and provided with registering slots, a plurality of tire supporting shoes carried by the said members, the adjacent ends of said shoes overlapping one another, and fastening means passing through the overlapping end of said shoes, and also through the slots in the end portions of the said supporting members.

2. A wheel of the class described including a hub, spokes, and rim, a plurality of supporting members encircling the said rim and secured thereto intermediate their ends, a plurality of tire supporting shoes carried by the said members, means for slidably securing the said shoes and supporting members together and means secured to the said shoes intermediate their ends, whereby to hold the tire in inflated position.

3. A wheel of the class described including a hub, spokes and rim, a plurality of substantially V-shaped supporting members encircling the said rim and being secured thereto, the adjacent ends of said members overlapping one another and provided with registering slots, a plurality of tire supporting shoes carried by said members, the adjacent ends of said shoes overlapping one another, certain of said overlapping ends being provided with slots, and fastening means secured to other of said overlapping ends and passing through the slots in the ends of said shoes and also through the registering slots in the ends of the supporting members, whereby the said tire supporting shoes and supporting members are permitted to slide relative to one another.

4. A wheel of the class described including a hub, spokes and rim, a plurality of substantially V-shaped supporting members encircling the said rim and being secured thereto, the adjacent ends of said members overlapping one another and provided with registering slots, a plurality of tire supporting shoes carried by said members, the adjacent ends of said shoes overlapping one another, certain of said overlapping ends being provided with slots, fastening means secured to other of said overlapping ends and passing through the slots in the ends of said shoes and also through the registering slots in the ends of the supporting members, whereby the said tire supporting shoes and supporting members are permitted to slide relative to one another, and spring means carried by said rim and passing therethrough and secured to the said shoes intermediate their ends, for holding the same in inflated position.

5. A wheel of the character described including a hub, spokes, and rim, a plurality of supporting members encircling the rim and having their adjacent ends overlapping one another, a plurality of tire supporting shoes carried by the said members and having their adjacent ends also arranged in overlapping relation relative to one another, and means for slidably securing the adjacent ends of the said supporting members and shoes together.

6. A wheel of the character described including a hub, spokes, and rim, a plurality of supporting members encircling the rim and having their adjacent ends overlapping one another, a plurality of tire supporting shoes carried by the said members and having their adjacent ends overlapping one another and also overlapping the adjacent ends of said members, and fastening means passing through the overlapping ends of the said supporting members and shoes for slidably connecting the same together.

7. A wheel of the class described including a hub, spokes, and rim, a plurality of supporting members encircling the said rim and mounted thereon, a plurality of tire supporting shoes carried by said members, a plurality of cups carried by said rim, bolts loosely passing through the said cups and rim and engaging with said tire supporting shoes, and spring means encircling the said bolts for normally urging the said shoes outwardly.

In testimony whereof I affix my signature.

O'DELL HINES.